UNITED STATES PATENT OFFICE.

AUGUST BISCHLER, OF ZURICH, SWITZERLAND, ASSIGNOR TO FABRIQUES DES PRODUITS CHIMIQUES DE THANN ET DE MULHOUSE.

ARTIFICIAL MUSK AND PROCESS OF MAKING SAME.

SPECIFICATION forming part of Letters Patent No. 546,086, dated September 10, 1895.

Application filed December 18, 1894. Serial No. 532,241. (Specimens.)

*To all whom it may concern:*

Be it known that I, AUGUST BISCHLER, a subject of the Emperor of Russia, residing at Zurich, Switzerland, have made a new and useful Improvement in the Manufacture of Artificial Musk, whereof the following is a specification.

The artificial musk has hitherto been prepared by nitration of aromatic hydrocarbons or phenolic ethers containing two or three hydrocarbonic lateral chains, one of which is always a butylic or amylic group. I have found that not only the above-mentioned aromatic hydrocarbons yield musk by nitration, but that aromatic cyanids containing two or three lateral chains, one of which is also a butylic, propylic, or amylic one, yield in the same manner by nitration musky-smelling substances.

As examples mention may be made of cyanide of butyltoluene,

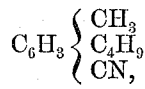

and butyl xylene,

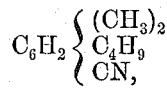

which by nitration are transformed into musk-smelling nitro derivatives. These substances differ from those of Dr. Baur's patents in so far as they contain not only nitro but also cyanid groups.

As an example I shall describe the preparation of dinitrobutyltolylcyanid. In order to prepare this substance I introduce one part of cyanid of butyltoluene in a mixture of four parts of fuming nitric acid of 45° to 50° Baumé and ten parts of fuming sulfuric acid of ten per cent. of $SO_3$, and I heat gently a few hours on the water bath. The mixture is then, after having been cooled, poured in water and the precipitate crystallized from alcohol or another suitable solvent. The cyanid of butylxylene treated in the same way gives a product of entirely similar properties.

The cyanid of butyltoluene has been prepared by Effront (see *Berichte der Deutschen Chemischen Gesellschaft zu Berlin*, XVII, page 2337) by treating formyl-isobutyltoluidin,

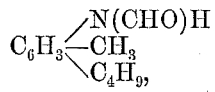

with zinc-dust.

I have found that the same compound is obtained more conveniently from iso-butyltoluidin by dyazotation and further treatment with cuprous and potassic cyanid according to the equation

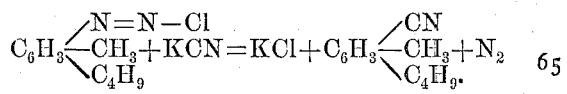

To carry out this process I dissolve one hundred and sixty-three parts of isobutyltoluidin in two hundred and six parts of concentrated hydrochloric acid and eight hundred parts of water, and I diazotize this solution by means of seventy parts of nitrite of soda dissolved in about two hundred parts of water. On the other side I prepare a solution of cuprous and potassic cyanid by adding two hundred and eighty parts of cyanid of potassium to a solution of two hundred and fifty parts of copper sulphate in about fifteen hundred parts of water. I mix these two solutions, allow them to stand for a few hours, and heat finally on the water bath until no more evolution of nitrogen takes place. The isobutyl-tolylcyanid is after this distilled by means of a current of steam. It forms white crystals insoluble in water, soluble in alcohol and ether, possessing a strong peculiar odor and a melting-point of 59° to 60° centigrade, as it is indicated by Effront.

The reaction representing the conversion of the cyanide of butyltoluene into the dinitro compound is as follows:

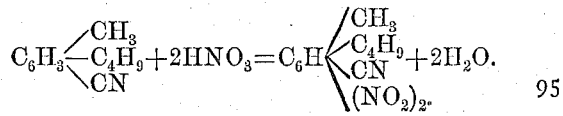

The new musk is a white crystalline body soluble in water, alcohol, ether, and other organic solvents and characterized by the fact that it is a derivative of aromatic cyanids containing two or three lateral chains, one of which is a butylic, (or propylic or amylic,) and that in its molecule the intact cyanogen group is contained besides the nitro group.

Having now fully described my said invention, what I claim is—

1. The herein described process of making artificial musk by first forming a cyanid derivative of an aromatic butylic hydrocarbon (such as cyanid of butyl toluene), introducing said cyanid compound into a mixture of fuming nitric and sulfuric acid, heating, and after cooling precipitating the resulting dinitro derivative from a suitable solvent, as set forth.

2. The artificial musk herein described, being a white crystalline body insoluble in water, soluble in alcohol and ethers, having a strong musky odor, and characterized by the presence in the aromatic butylic hydrocarbons of one cyanid and two nitro groups, as set forth.

In testimony that I claim the foregoing as my invention I have signed my name in presence of two subscribing witnesses.

AUGUST BISCHLER.

Witnesses:
GEORGE GIFFORD,
FALCONER E. CROWE.